Dec. 17, 1963  J. C. CLARK  3,114,514
SPIN-CAST FISHING REEL
Filed May 5, 1959  4 Sheets-Sheet 1

INVENTOR.
JOSEPH C. CLARK
BY
Lloyd J. Andres

Dec. 17, 1963   J. C. CLARK   3,114,514
SPIN-CAST FISHING REEL
Filed May 5, 1959   4 Sheets-Sheet 2

INVENTOR.
JOSEPH C. CLARK
BY

Dec. 17, 1963 J. C. CLARK 3,114,514
SPIN-CAST FISHING REEL
Filed May 5, 1959 4 Sheets-Sheet 3

INVENTOR.
JOSEPH C. CLARK
BY
Lloyd J. Andres

Dec. 17, 1963   J. C. CLARK   3,114,514
SPIN-CAST FISHING REEL
Filed May 5, 1959   4 Sheets-Sheet 4
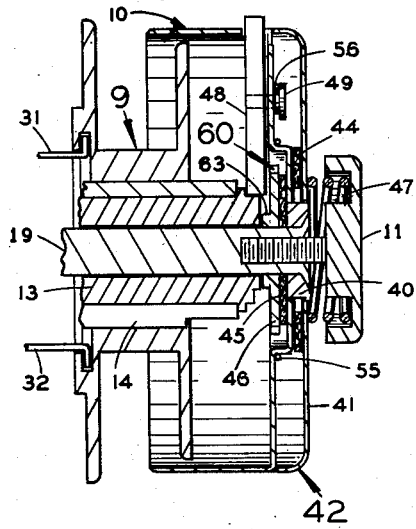
FIG. 11
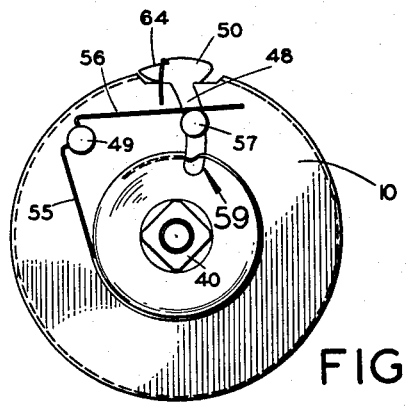
FIG. 12
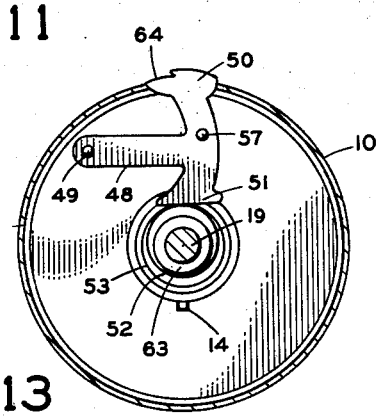
FIG. 13
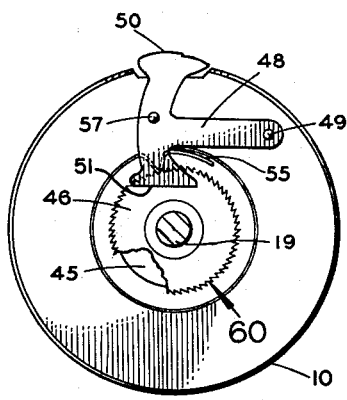
FIG. 14
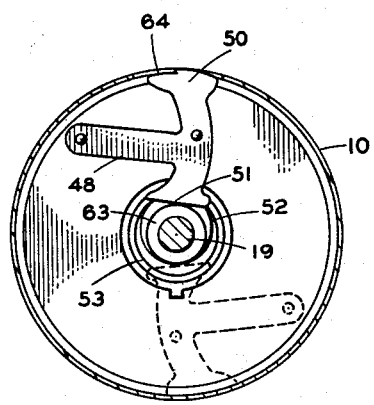
FIG. 15
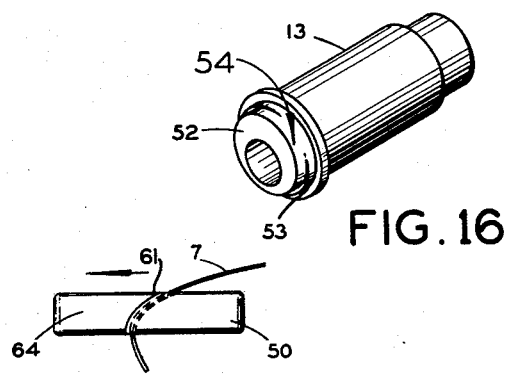
FIG. 16
FIG. 17
INVENTOR.
JOSEPH C. CLARK
BY
Lloyd J. Andres

# United States Patent Office 3,114,514
Patented Dec. 17, 1963

3,114,514
SPIN-CAST FISHING REEL
Joseph C. Clark, Orlando, Fla., assignor to True Temper Corporation, Cleveland, Ohio, a corporation of Ohio
Filed May 5, 1959, Ser. No. 811,162
3 Claims. (Cl. 242—84.21)

This invention relates in general to fishing reels and more particularly to the spinning type of reel for use with conventional casting rods.

It is an object of my invention to provide an improved line pickup means for a spinning reel of the type referred to.

Another object of the invention is the provision of an improved means for projecting and retracting the winding dog into and from the winding drum and wherein the dog configuration is adapted to minimize line friction when operated.

Another object of the invention is the provision of a winding drum and an adjacent auxiliary guide drum independently journalled with respect to each other for distributing the line wear around the periphery of the latter when the reel is operated.

Another object of the invention is an effective simplification of components resulting in a low manufacturing cost and including the use of transparent and other materials inherently resistant to the corrosive effects of salt water.

A further object of the invention comprehends a spool and winding means therefor which prevents the twisting of the line when cast and reeled in.

These and other objects and advantages in one embodiment of the invention are described and shown in the following specification and drawings in which:

FIG. 11 is an enlarged fragmentary cross sectional view of the right portion of FIG. 5, depicting more clearly the structural relationship therein.

FIGS. 12, 13, 14, 15, 16 and 17 are enlarged illustrations of the line pick up or winding elements shown in FIGS. 3, 4 and 5.

Figure 1:
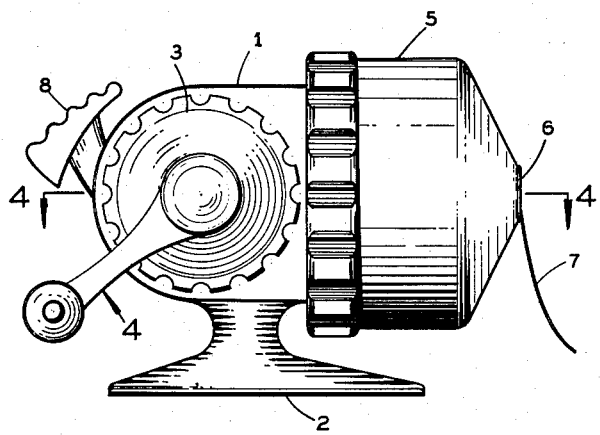
FIG. 1 is a right side elevation of the reel.

Referring to FIG. 1, the reel consists of a main housing 1 having an integral foot or cleat 2 adapted to be secured to a casting rod by well known means. A crank bearing cap 3 is threaded into housing 1 by means of left hand threads and retains the winding crank 4 and other elements to be hereinafter described.

A spool housing 5 is threaded on the housing 1 and is provided with a coaxial wear resistant guide 6 through which the line 7 enters the housing.

A thumb lever 8 is pivotally mounted on housing 1 and projects through a suitable aperture in the rear of the latter and is positioned for convenient thumb operation for movement to each of three positions for releasing, casting and controlling the line.

The main housing 1, left threaded bearing cap 3, spool housing 5 and spool 9 are preferably molded from an acrylic or other suitable transparent plastic material in the interest of resistance to the effects of weather and salt water. The molding of the above components from this material results in not only low manufacturing cost but also provides for visual inspection of the internal parts of the reel without disassembly.

Figure 2:
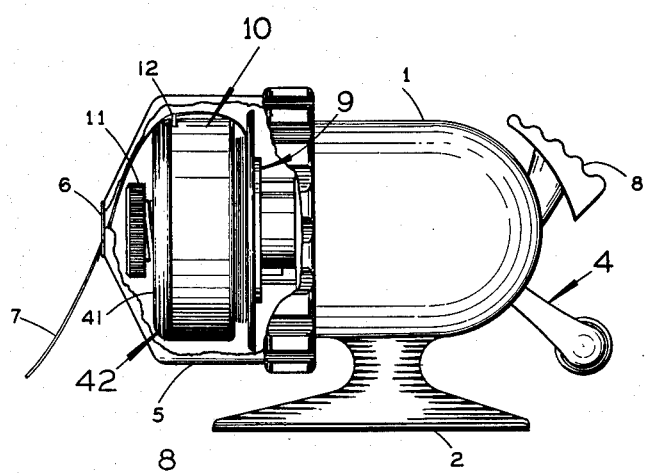
FIG. 2 is a left side elevation of the reel shown in FIG. 1 with a portion of the housing broken away.
Figure 3:
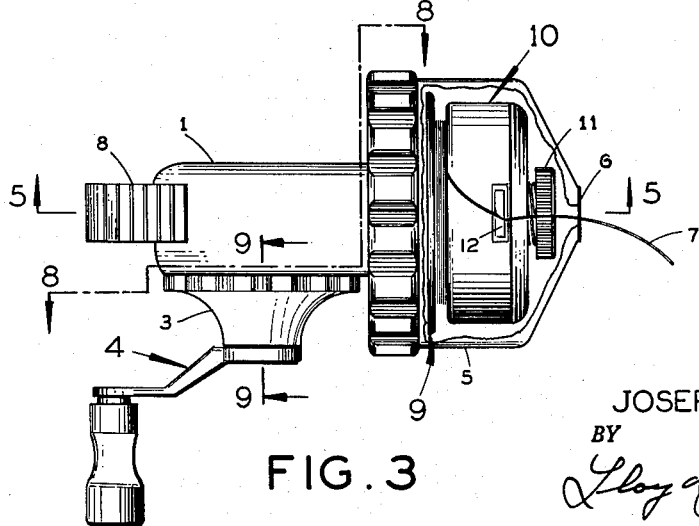
FIG. 3 is a plan view of the reel shown FIG. 1 with a portion of the housing broken away.

Referring to FIGS. 2 and 3, the broken away spool housing 5 shows the flanged spool 9, winding drum 10, brake adjustment 11 and the winding dog 12 in their relative operating positions.

Figure 4:
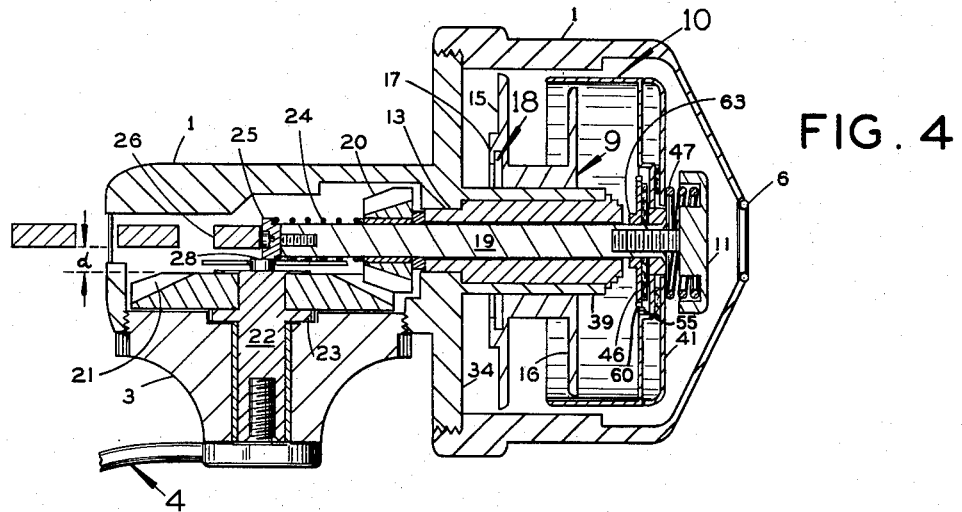
FIG. 4 is an enlarged cross sectional plan view taken through section line 4—4, FIG. 1.

Referring to FIGS. 4 and 16, a bushing 13 having a coaxial bore therethrough is secured in a coaxial bore in a sleeve 39 which is integral with wall 34 of housing 1. The spool 9 is concentrically journalled on sleeve 39 for axial reciprocation and is prevented from rotation by the engagement of key 14 integral with sleeve 39, with a mating axial groove in the bore of the spool.

The spool 9 is provided with inner and outer flanges 15 and 16 of different diameters as shown and a concentric flange member 17 forming a circular undercut 18.

A main shaft 19 journaled for axial reciprocation in bushing 13 supports the winding drum 10 and a brake means at its outer end, to be hereinafter described. A mitre gear 20 is keyed to shaft 19 and adapted to permit reciprocation of the shaft 19 therethrough, and is positioned for constant engagement with a mitre drive gear 21 secured to the inner end of crank shaft 22. The crank 4 is threaded into a concentric bore in the outer end of shaft 22 and the shaft is retained for rotation in cap 3 by a wheel 23 integral therewith. A coil compression spring 24 around the inner end of shaft 19 is biased against gear 20 by a flanged screw 25 threaded into the inner end of shaft 19 as shown. Thus it will be apparent that the rotation of crank 4 will rotate shaft 19 at a stepped up speed ratio in accordance with the diameters of gears 20 and 21.

Figure 5:
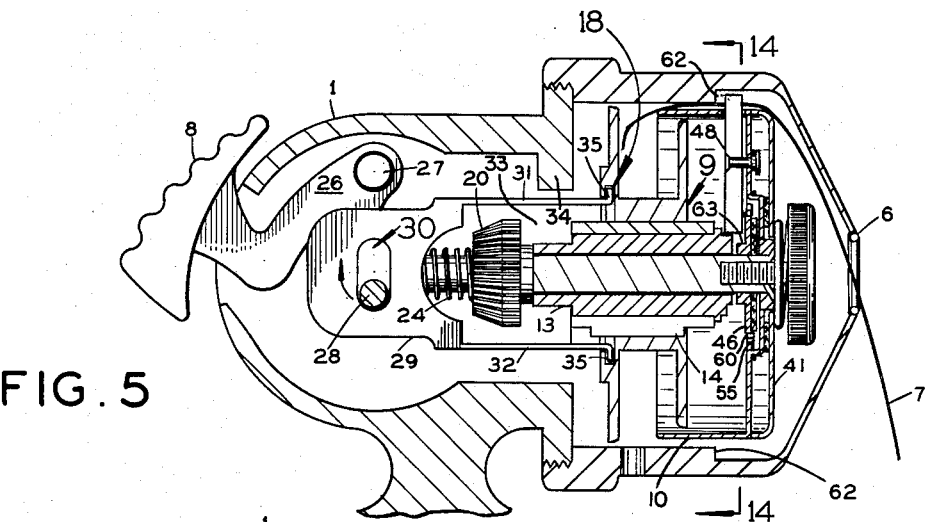
FIG. 5 is a cross sectional elevation taken through section line 5—5, FIG. 3.
Figure 10:
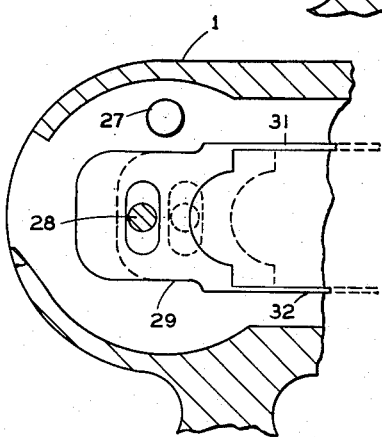
FIG. 10 is a fragmentary cross sectional view similar to FIG. 5 and showing a portion thereof in changed position.
Figure 6:
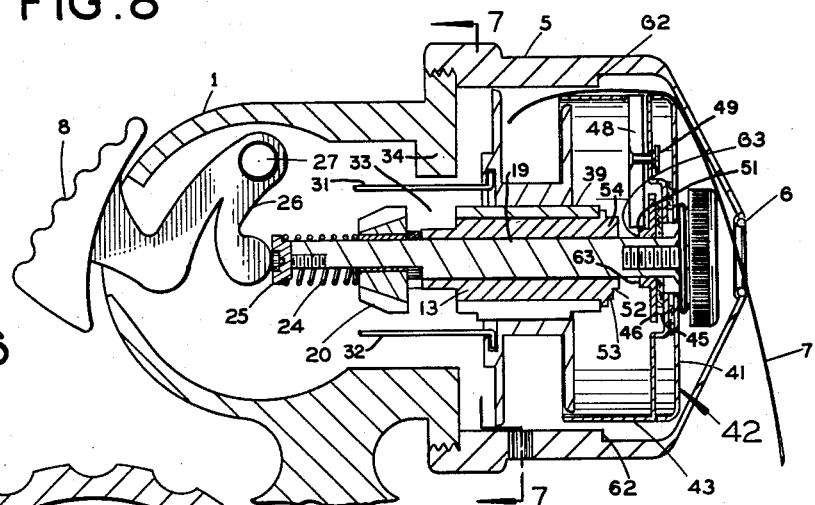
FIG. 6 is similar to FIG. 5 with certain elements being in changed position and wherein certain elements are deleted for clarity.

The internal portion of thumb lever 8 forms a bellcrank 26 pivoted for oscillation about a short cylindrical projection 27 integral with housing 1 as shown in FIGS. 5 and 10. The innermost end of the bell-crank 26 is adapted to engage the end surface of screw 25, as shown in FIGS. 4 and 6. Thus the spring 24 normally urges the shaft 19 in its normal retracted position and the lever 8 in its normally outward rest position. When the lever 8 is depressed, it will be apparent that the innermost end of the bell-crank 26 will, through abutment with the screw 25, as shown in FIG. 6, move shaft 19 longitudinally to the right, as viewed in FIG. 6. This longitudinal movement causes the curved portion 42 of plate 41 to abut the inside surface of housing 5, thus snubbing the line 7 and precluding the same from paying out.

Figure 7:
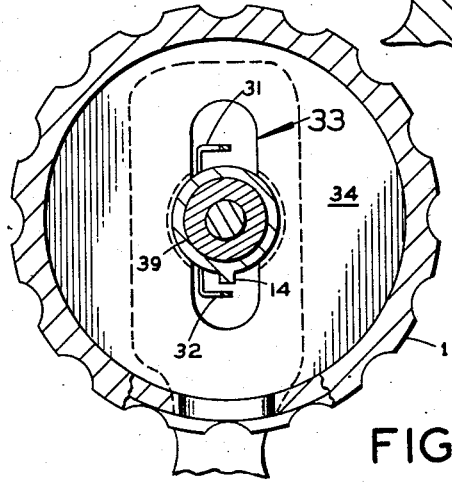
FIG. 7 is a cross sectional view taken through section line 7—7, FIG. 6.

Refering to FIGS. 4 and 5, a crank pin 28 extends from the inner end of shaft 22 with the axis of said pin being displaced in a predetermined distance from the axis of rotation of the shaft. Referring to FIGS. 5, 7, and 10, a level winding yoke 29 has a vertical slot 30 in one end thereof in working engagement with crank pin 28 and a fork at the other end thereof comprising a pair of like arms 31 and 32 which project through aperture 33 in a transverse wall 34 in housing 1, shown in FIG. 7. The outer ends of arms 31—32 terminate in outward projecting lugs 35—35, which lugs are sprung into engagement with circular recesses 18 in spool 9, shown in FIGS. 5 and 6. Thus it is apparent that when crank 4 is rotated the yoke 29 will be reciprocated by means of eccentrically mounted pin 28 and, in turn, will reciprocate the spool 9 through a predetermined path along sleeve 39 for the purpose of level winding the line fed thereto by the winding drum, to be hereinafter described.

Figure 8:
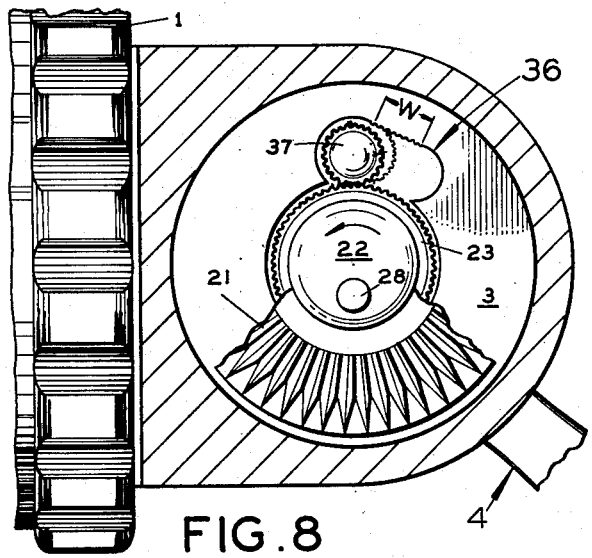
FIG. 8 is an enlarged fragmentary cross sectional view taken through section line 8—8, FIG. 3.
Figure 9:
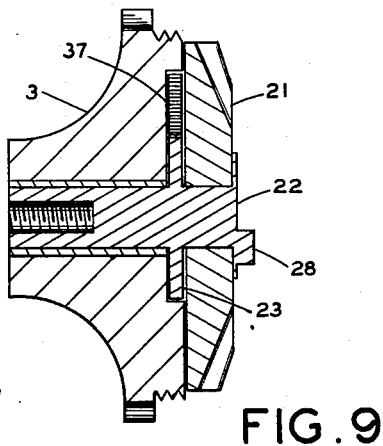
FIG. 9 is an enlarged fragmentary cross sectional view taken generally through section line 9—9, FIG. 3.

An automatic uni-directional lock is shown in FIGS. 8 and 9 in which bearing cap 3, in addition to having a clearance recess for wheel 23, is provided with an auxiliary pocket 36, the walls of which loosely retain a lock roller 37 adjacent the inner side of gear 21 as shown. Both the wheel 23 and the roller 37 are preferably provided with fine teeth, or a knurl, on the outer peripheries thereof. A portion W of the outer wall of pocket 36 is positioned at a predetermined angle with respect to the periphery of wheel 23.

When the reel is tilted downward in a direction normal to the axis of crankshaft 22 the lock roller will gravitate forward for free rotation on wheel 23.

When the reel is tilted upward the roller 37 will move backward and wedge between the wheel 23 and the wall W, effectively locking crankshaft 22 against counter rotation. It is to be noted that forward rotation of the crank in the direction of the arrow shown in FIG. 8 will release the locking action of roller 37. Thus it is apparent that the line may be reeled in regardless of the position of the rod. For permitting the withdrawal of the line as required for trolling, the rod is tilted downward which permits the crank to rotate as the line is withdrawn and the number of turns will indicate the length of the line released which may be stopped by merely raising the rod upward which will engage the roller 37 and thus lock the line in trolling position.

Slippage of the lock previously described is prevented when the teeth of wheel 23 engage the teeth on roller 37. Because of the slightly resilient nature of the outer wall of recess 36 as compared to roller 37, if there is any stress applied during the locking action of the roller 37, the teeth thereon will form corresponding minute teeth in the wall, as shown in FIG. 8, thus securely locking the shaft 22 from rotation in a direction opposite to that direction required for reeling in the line.

Referring to FIG. 11, the enlarged cross sectional view of the winding drum 10 is shown with the elements therein in their normal rest position. The shaft 19 has secured to its outer end a square drive member 40 which is adapted to engage a square central aperture in the circular guide plate 41 as shown. This plate has a curved corner portion 42 over which the line passes during the reeling operation. The winding drum 10 has a coaxial bore in the center of an offset central portion thereof and is adapted to rotate about hub 63 on shaft 19. A friction disc 45 is positioned between the inner face of the winding drum and a flange 46 integral with shaft 19 as shown. A drag adjustment screw 11 coaxial with drive member 40 is threaded into the bore of the shaft and is adapted to retain a compression spring 47 in pressure contact with the outer surface of the plate 41. Thus the drum 10 is under the influence of spring 47 due to the frictional discs 44 and 45 being frictionally engaged for rotation with plate 41 when the latter is driven by shaft 19. This frictional engagement, however, permits the independent rotation of the drum 10 with respect to plate 41 when shaft 19 is locked under conditions to be hereinafter described.

Referring to FIGS. 12 and 13, the line pick-up or winding means comprises a pawl lever 48 of substantially T-shape configuration which is pivoted for oscillation on the end wall of drum 10 about shoulder stud 49 which is fixed to the end wall of drum 10, as shown in FIG. 11. Pawl lever 48 has a cross member having an integral line hook 50, at one end thereof, adapted to extend through an aperture in the outer periphery of the drum. An integral cam follower 51 is positioned on the opposite end of the cross member of lever 48 for engagement with the outer periphery of cam 52 and the shoulder 53 on the end of the sleeve or bushing 13, better shown in FIG. 16. It is to be noted that the outer surface of cam 52 and shoulder 53 coincide in a flat common area 54 as shown in FIG. 16.

Referring to FIG. 12, a torsion spring 55 is retained by the end of stud 49 and a free end 56 thereof engages the head of a stud 57, said stud being adapted to reciprocate in a slot 59 in the drum 10. The spring is biased to normally urge the lever 48 into the withdrawn position shown in FIG. 15 with the follower 51 resting on hub 63 of shaft 19. The spring 55 also encircles the offset in drum 43 and passes through aperture 59 for frictional engagement with teeth 60 on the outer edge of flange 46. The purpose of the contact of the teeth 60 with spring 55 is to provide a signal sound when there is relative motion between drum 10 and plate 41. This condition exists, for example, when the drum is rotated by a stress on the line and the shaft 19 is locked, which condition may arise at the instant of hooking a fish.

Referring to FIGS. 13 and 17, it is to be noted that the dog 50 has an arcuate undercut groove 61 for engaging the line in a natural curved path to minimize friction and resultant wear. It is also to be noted that the arcuate outer surface 64 of the dog is adapted to be projected outward slightly above the periphery of drum 10 whereby the line is prevented from frictional engagement with the outer surface of the drum when reeled in.

In operation and under the assumption that the reel is secured to a rod for casting a lure and the rod is held in a downward position, the elements will be in the position shown in FIGS. 2 and 5, with the clutch roller 37 in disengaged position as shown in FIG. 8 and the winding dog 50 projected into position for engagement with line 7. In the event the lure is dropped into the water for trolling, the unwinding of the line from the spool will rotate the drum clockwise viewed from the front and rotate the crank counterclockwise. It is apparent that the lure will withdraw the line for trolling a distance which may be approximately measured by counting the revolutions of the crank since the linear movement of the line for each revolution of the crank is established by the ratio of the gears 20 and 21.

The payout of the line may be automatically stopped by merely raising the rod which will automatically engage the roller 37 and prevent the counter rotation of the crank and drum. In the event of a strike, the line will pay out only under the predetermined tension supplied by the drag discs 44—45, shown in FIG. 11, under the adjustment of nut 11.

It is now apparent that when the line is payed out under the above drag condition the drum 10 will rotate and the plate 41 will remain stationary thus distributing the frictional wear around the curved periphery of plate 41. It is also apparent that the frictional wear on the dog is distributed over the arcuate groove therein which retains the line above the outer periphery of drum 10.

At any instant during the payout of the line under drag conditions the now stationary crank may be rotated in clockwise direction to retrieve the line. It is apparent that during the payout of the line, the thumb lever 8 may be depressed to brake and stop the outward travel of the line by virtue of engagement between plate 41 and the inside surface of the housing 5.

It is also to be noted that this braking action may be applied with gentle precision by virtue of the radial resilience of the planar portion of the plate.

Under the assumption that the line is fully wound on a spool as shown in FIG. 2 and for making a cast, the rod is raised in conventional manner and the user's thumb fully depresses the operating lever 8, snubbing the line between the plate 41 and the inner periphery of the housing 5. During the first portion of the cast the line is restrained until freed by releasing the thumb lever permitting the line to unwind in a helical fashion around the drum from the stationary spool and through guide 6 under the influence of the inertia of the lure, by virtue of the spring 24 retracting the drum without projecting the winding dog.

In order to limit the range of the cast the thumb lever 8 is further depressed thus applying a snubbing or braking action to the line as previously described. At the completion of the cast the thumb level may be released and the line retrieved by operating the crank. In the event of a strike or a snag the line may be locked by merely raising the rod upward thus automatically engaging the clutch roller 37 as previously described.

During the first revolution of the drum by the crank the spring 24 will urge the drum inward, enabling the follower 51 of the member 48 to engage the low portion of the eccentric cam 52 for projecting the dog 50 outward to engage the line. Following rotation of the eccentric 52 the follower 51 will ride upon the periphery on the concentric shoulder 53 thus holding the dog in outward position for drum winding the line upon the non-rotating spool 9, thus preventing twist in the line.

The line is level wound on the spool with each turn in spaced relation by virtue of the rotation of the crank pin 28 for reciprocating the winding yoke 29 with the lugs 35—35 engaged in the recess 18 in the spool whereby the spool will reciprocate along its axis one cycle for each revolution of the crank. When reeling in, the drum 10 is in its retracted position and the line will be fed from the inner edge thereof to the spool for level winding on the reciprocating spool.

To insure the positive engagement of the dog 50 with the line during the first revolution of the retracted drum and referring to FIG. 5, it will be noted that the inner periphery of the housing 5 is positioned in close proximity in the outer periphery of the drum 10 with space therebetween just sufficient for the free passage of the line. An offset step 62 around the inner periphery of housing 5 is provided for the path of movement of the dog 50 when extended, thus insuring the engagement of the line with the dog during the first revolution of the dog.

It is to be noted that when the reel is operated under the above described drag conditions and there is relative rotation between drum 10 and plate 41, the inner end of spring 55 will sequentially engage teeth 60 on the disc 46 as shown in FIG. 14 and emit a signal for alerting the user to a strike or a snag.

The adjustment of the drag may be preset to a desired degree by the simple expedient of unscrewing and removing the spool housing and adjusting the nut 11. The reel may be further disassembled by unscrewing the left hand threaded bearing cap 3, by rotating same in a clockwise direction which will expose the remainder of the internal parts. The yoke member 29 is normally retained for reciprocation in the space d illustrated in FIG. 4 between one side of the lever 26 and the inner end of the shaft 22. Thus when the cap 3 is removed the yoke 29 may be laterally displaced and the lugs 35—35 disengaged from the spool by squeezing the arms 31 and 32 toward each other. Upon the removal of the yoke the lever 8 may be lifted from the projection 27.

The removal of screw 25 will permit the withdrawal of shaft 19 and the drum assembly from the housing 1 and the removal of the spool 9. It is apparent that a conventional snap washer in the end of the main shaft may be used as an alternate to screw 25 in order that the reel may be completely disassembled and assembled without the use of tools.

It should now be apparent that the automatic and other features in the forgoing described reel not only result in efficient semi-automatic operation, but also provide for a weatherproof mechanism with a minimum number of parts and adapted to low cost manufacture.

It is understood that certain modifications in the construction of the reel utilizing the features described are intended to come within the scope of the appended claims.

Having described my invention, I claim:

1. In a reel of the character described, the combination comprising a housing, a shaft extending through said housing, a stationary sleeve mounted on said shaft, said shaft being reciprocable and rotatable within said sleeve, said sleeve having a cam surface at the end thereof, a spool member longitudinally reciprocable and non-rotatably mounted on said sleeve for retaining a line wound thereon, drum means rotatably mounted on said shaft in said housing and disposed adjacent said spool member, line pickup means rotatably mounted on the end wall of said drum, said line pickup means being substantially T-shaped, means pivotably mounting said line pickup means on the end wall of said drum, spring means, the cross member of said T-shaped line pickup means comprising a follower portion at one end thereof adapted to engage said cam surface of said sleeve, said spring means exerting radially directed spring pressure against said follower portion, and a line engaging portion at its other end adapted to extend through an aligned aperture in the periphery of said drum whereby when said line pickup means is projected outwardly by said cam surface said line engaging portion will engage the line and wind the same on said spool, a disc mounted on a forward end of the said shaft, said disc having a plurality of teeth disposed about its outer peripheral edge, a portion of said spring means adapted to sequentially engage teeth on the said disc and emit a signal, comprising a portion of said spring means disposed about said mounting means for said line pickup means on the end wall of said drum, an aperture in said end wall, an end portion of said spring adapted to be disposed through said aperture for frictional engagement with the teeth on the said disc.

2. In the reel of the character described, the combination comprising a housing, a reciprocable and rotatable shaft extending through said housing, a stationary sleeve secured to said housing, said sleeve having a plurality of cam surfaces at the foremost end thereof, a spool member mounted on said sleeve for retaining a line wound thereon, drum means disposed within said housing and rotatably mounted on said shaft adjacent said spool member, a circular guiding plate mounted on said shaft, said guide plate having a curved rearwardly extending flange flush with and adapted to contact the outer peripheral edges of said winding drum, line pickup means rotatably mounted on the inner face of an end wall of said drum, said line pickup means comprising a relatively flat cam follower portion at one end thereof adapted to sequentially contact said cam surfaces and a line engaging portion at an opposite side thereof adapted to extend through an aligned aperture in the periphery of said drum, said plate adapted to have frictional engagement with said drum, means whereby said drum is adapted to have independent rotation with respect to the plate under certain operating conditions and said plate under such conditions being non-rotatable.

3. In a reel of the character described, the combination comprising a housing, a shaft extending through said housing, a stationary sleeve mounted on said shaft, said shaft being reciprocable and rotatable within said sleeve, said sleeve having a cam surface at the end thereof, a spool member longitudinally reciprocable and non-rotatably mounted on said sleeve for retaining a line wound thereon, drum means rotatably mounted on said shaft in said housing and disposed adjacent said spool member, line pick up means rotatably mounted on the end wall of said drum, spring means, said line pick up means being substantially T-shaped, means pivotably mounting said line pick up means on the end wall of said drum, the cross member of said T-shaped line pick up means comprising a follower portion at one end thereof adapted to engage said cam surface of said sleeve, said spring means exerting radially directed spring pressure against said follower portion and a line-engaging portion at its other end adapted to extend through an aligned aperture in the periphery of said drum, whereby when said line pick up means is projected outwardly by said cam surface said line-engaging portion will engage the line and wind the same on said spool, a disc mounted on a forward end of the said shaft, said disc having a plurality of teeth disposed about its outer peripheral edge, a portion of said spring means adapted to sequentially engage teeth on the said disc and emit a signal.

References Cited in the file of this patent

UNITED STATES PATENTS

| | | |
|---|---|---|
| Re. 2,020 | Jochum | July 4, 1865 |
| 138,881 | Gladney | May 13, 1873 |
| 1,053,871 | Purdom | Feb. 18, 1913 |
| 1,788,098 | Fuller | Jan. 6, 1931 |
| 2,431,493 | McIlrath | Nov. 25, 1947 |
| 2,600,558 | Mauborgne | June 17, 1952 |
| 2,644,647 | Denison et al. | July 7, 1953 |
| 2,711,292 | Taggart et al. | June 21, 1955 |
| 2,736,510 | Skelton et al. | Feb. 28, 1956 |
| 2,771,253 | Mauborgne | Nov. 20, 1956 |
| 2,776,803 | Shakespeare et al. | Jan. 8, 1957 |
| 2,777,645 | Wood | Jan. 15, 1957 |
| 2,828,088 | Denison et al. | Mar. 25, 1958 |
| 2,854,200 | Montgomery | Sept. 30, 1958 |
| 2,862,679 | Denison et al. | Dec. 2, 1958 |
| 2,863,616 | Hutchinson et al. | Dec. 9, 1958 |
| 2,903,201 | Sarah | Sept. 8, 1959 |
| 2,903,202 | Sarah | Sept. 8, 1959 |
| 2,966,314 | Mombur | Dec. 27, 1960 |

FOREIGN PATENTS

| | | |
|---|---|---|
| 1,172,393 | France | Oct. 13, 1958 |